United States Patent [19]

Ishimoto

[11] Patent Number: 5,061,579
[45] Date of Patent: Oct. 29, 1991

[54] BATTERY RECEPTACLE FOR RADIO CONTROLLABLE MOTOR TOYS

[75] Inventor: Zenichi Ishimoto, Tokyo, Japan

[73] Assignee: Nikko Co., Ltd., Tokyo, Japan

[21] Appl. No.: 501,129

[22] Filed: Mar. 29, 1990

[30] Foreign Application Priority Data

Apr. 4, 1989 [JP] Japan .................................. 1-83914

[51] Int. Cl.⁵ .............................................. H01M 2/10
[52] U.S. Cl. ........................................ 429/96; 429/49; 429/100
[58] Field of Search ....................... 429/97, 99, 100, 98

[56] References Cited

U.S. PATENT DOCUMENTS

| 2,034,188 | 3/1936 | Hoeck | 429/97 X |
| 2,590,804 | 3/1952 | Vitale | 429/97 |
| 4,205,121 | 5/1980 | Naitoh | 429/99 |
| 4,389,469 | 6/1983 | Nicholls | 429/100 X |
| 4,464,445 | 8/1984 | Matti | 429/100 X |
| 4,690,878 | 9/1987 | Nakamura | 429/99 X |
| 4,737,420 | 4/1988 | Ikeda et al. | 429/99 X |
| 4,853,302 | 8/1989 | Yamanaka et al. | 429/100 X |
| 4,883,725 | 11/1989 | Gerard | 429/99 |

Primary Examiner—Stephen J. Kalafut
Attorney, Agent, or Firm—Young & Thompson

[57] ABSTRACT

A battery receptacle in which either of individual dry batteries and individual or packaged nickel-cadmium batteries can be received to be used as a power source for a radio controllable motor toy so that interchangeability of batteries used in the motor toys and space saving can be realized.

3 Claims, 3 Drawing Sheets

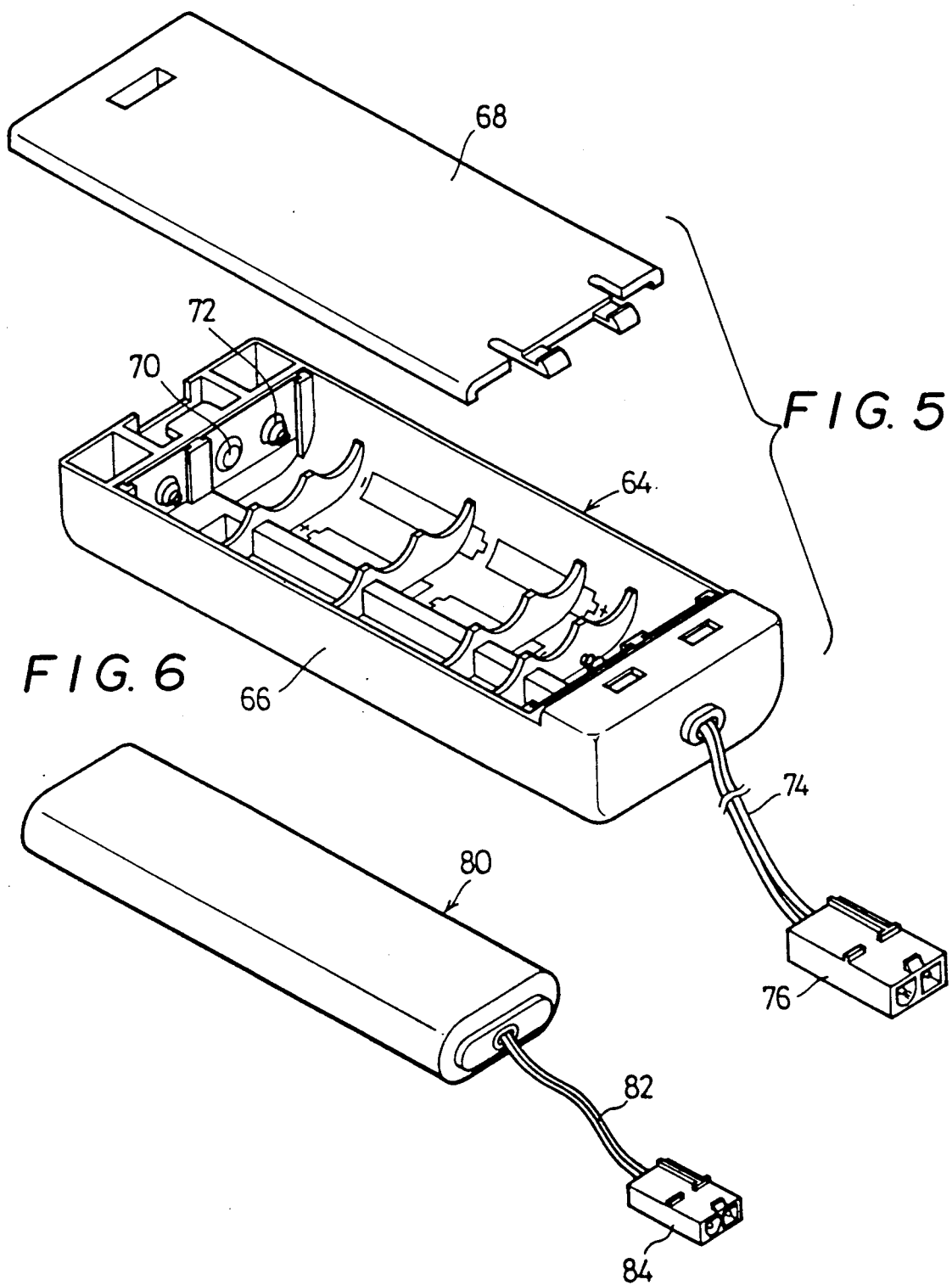

BATTERY RECEPTACLE FOR RADIO CONTROLLABLE MOTOR TOYS

FIELD OF THE INVENTION

This invention relates to an improvement in a power battery receptacle for radio controllable motor toys of a various types.

BACKGROUND OF THE INVENTION

Conventionally, for example, in such a motor toy as a radio controllable car and the like, a battery receptacle for receiving batteries to be used as a power source has been formed integratedly in a plastic vehicle body and provided with a space which can be covered with an openable lid and which has appropriate configuration enough to receive a given number of the batteries having specific dimensions.

In general, a dry battery is best known as a power battery usable in a motor toy of the above type. However, since the dry battery of disposable type has only a small electric energy, it is worn out in a short time when used for a high performance and high power-consuming motor toy. To this end, a nickel-cadmium battery has recently been used as the power battery of the motor toy.

In the case that the nickel-cadmium battery has almost the same configuration as a conventional dry battery, a given number of the nickel-cadmium batteries can be received without any structural or configurational change in an existing dry battery receptacle. However, upon charging of the battery, a battery charger with specific battery-receiving casing is required. Therefore, the nickel-cadmium battery has such disadvantages that not only a cost of the battery charger is increased but charging operation becomes complicated. In order to overcome the disadvantages, there has been manufactured a packaged nickel-cadmium battery unit package comprising an individual connector and the given number of the nickel-cadmium batteries packaged as one unit which are in internal and electric connection with each other. As a result, the charging operation and the connection between the packaged nickel-cadmium battery unit and the motor toy can be facilitated.

On the other hand, the aforementioned packaged nickel-cadmium battery unit is connected through a specific connector to the motor toy and differs in dimension from a battery casing which receives the necessary number of dry batteries. Therefore, the packaged nickel-cadmium battery unit can not be received in an existing dry battery receptacle. For this reason, upon manufacture of motor toys, the battery receptacle having different sizes should be individually formed depending upon a kind of batteries to be used in the motor toy. Moreover, since the motor toys using general dry batteries are different in a structure of the battery receptacle from those using a packaged nickel-cadmium battery unit, there is no interchangeability between both kinds of the batteries. To this end, one type of batteries usable in a certain motor toy, for instance, a packaged nickel-cadmium battery unit which has an economic advantage is not adaptable to a wide range of other motor toys due to the limited compatibility.

SUMMARY OF THE INVENTION

It is an object of the invention to provide a battery receptacle in which either of individual dry batteries and individual or packaged nickel-cadmium batteries can be received to be used as a power source for a radio controllable motor toy so that interchangeability of batteries used in the motor toys and space saving can be realized.

A battery receptacle of a radio controllable motor toy according to the invention comprises a battery-receiving chamber which is defined by wall sections so as to be formed in a predetermined configuration on a bottom face of a plastic vehicle body of the radio controllable motor toy. In the battery-receiving chamber are received batteries to be used as a power supply for both a radio receiver and a drive motor of the motor toy.

The battery receiving chamber is formed so as to have enough space to receive either of a packaged nickel-cadmium battery unit capable of developing a given combined output voltage and a battery casing capable of receiving a given number of individual batteries.

One side wall of the battery receptacle is partially cut out to form a cut out portion for receiving two connectors and lead wires through which the radio receiver and the drive motor of the motor toy are connected to either the packaged nickel-cadmium battery unit or individual batteries received in the battery casing which are used as a power supply therefor.

A pair of projections are formed on each outer face of opposite side walls of the battery casing so as to fit a pair of grooves formed on each inner face of opposite side walls of the battery-receiving chamber, one side wall of which is provided with the cut out portion.

According to the invention, there is provided a battery receptacle of a radio controllable motor toy including a battery-receiving chamber which is provided on a bottom face of a plastic vehicle body of the radio controllable motor toy so as to have enough space to receive either of a packaged nickel-cadmium battery unit capable of developing a given combined output voltage and a battery casing capable of receiving a given number of individual batteries. Therefore, the packaged nickel-cadmium battery unit per se and the battery casing receiving the given number of individual batteries can be respectively mounted on the motor toy with interchangeability or compatibility therebetween and space saving when used as a power source for both a radio receiver and a drive motor of the motor toy. In such a case, one side wall of the battery receptacle having the battery-receiving chamber therein is partially cut out so as to receive two connectors and lead wires through which the radio receiver and the drive motor of the motor toy are connected to either the packaged nickel-cadmium battery unit or the individual batteries received in the battery casing which are used as a power supply therefor. To this end, not only batteries which are mounted on the motor toy are easily connected to the radio receiver and the drive motor of the motor toy but individual nickel-cadmium batteries received in the battery casing are conveniently charged without any complicated operation.

The invention will be described hereinafter in more detail for the preferred embodiments with reference to the accompanying drawings.

BRIEF DESCRIPTION OF THE DRAWINGS

FIG. 5 is a perspective view of a battery casing to be received in a battery receptacle shown in FIG. 4; and FIG. 6 is a perspective view of a packaged nickel-cadmium battery unit to be received in the battery receptacle shown in FIG. 4.

PREFERRED EMBODIMENTS OF THE INVENTION

Figure 1:
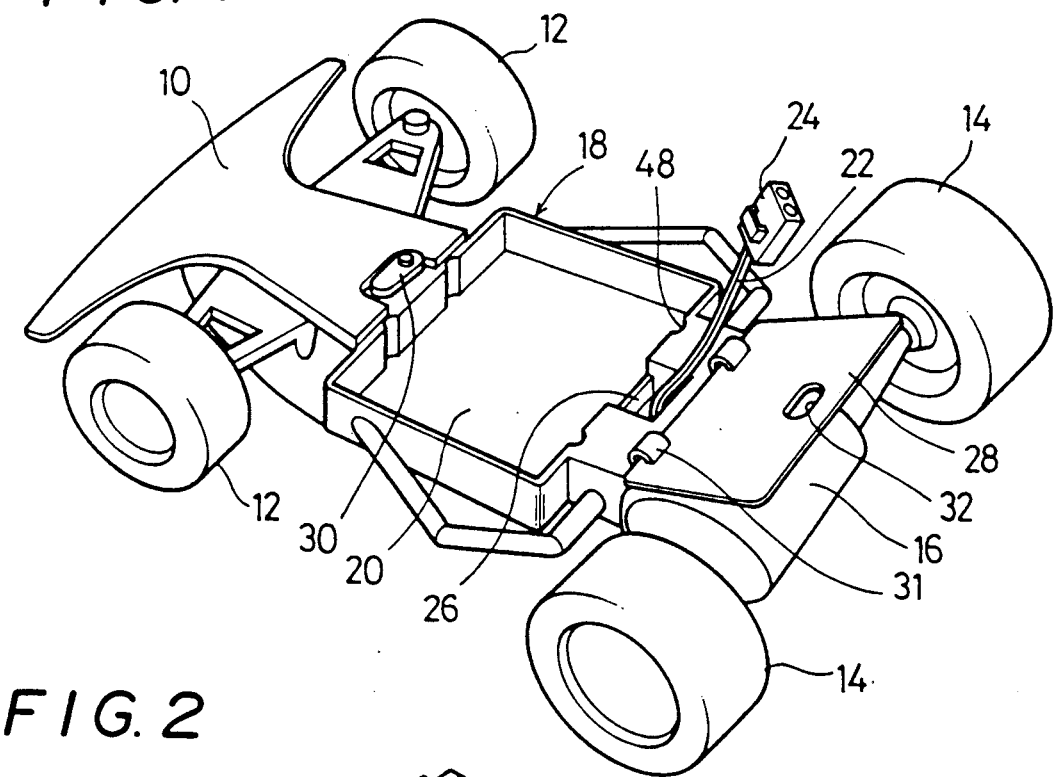
FIG. 1 is a schematic perspective view illustrating a bottom portion of a vehicle body of a radio controllable motor toy made as one embodiment according to the invention.
Figure 2:
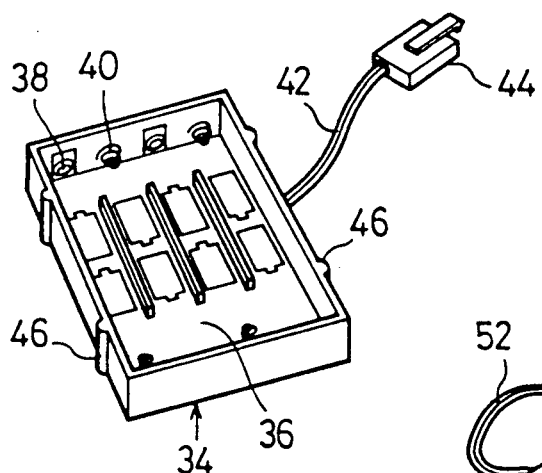
FIG. 2 is a perspective view of a battery casing to be received in a battery-receiving chamber of a battery receptacle shown in FIG. 1.
Figure 3:
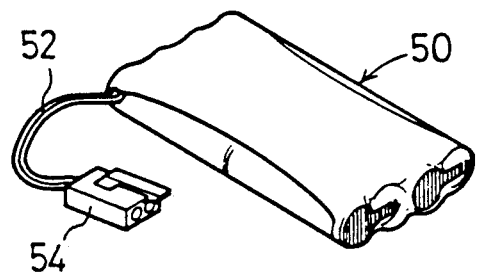
FIG. 3 is a perspective view of a packaged nickel-cadmium battery unit to be received in the battery receptacle shown in FIG. 1.

FIG. 1 is a schematic perspective view illustrating a bottom portion of a vehicle body of a radio controllable motor toy made as one embodiment according to the invention. FIG. 2 is a perspective view of a battery casing which detachably receives general dry batteries or nickel-cadmium batteries and which is received in the battery receptacle of FIG. 1. FIG. 3 is a perspective view of a packaged nickel-cadmium battery unit to be received in the battery receptacle of the radio controllable motor toy shown in FIG. 1.

Referring now to FIG. 1, front wheels 12, 12 and rear wheels 14, 14 are mounted on front and aft portions of a plastic vehicle body 10 of the radio controllable motor toy. In this case, the front wheels 12, 12 are connected to an appropriate steering mechanism (not shown) which is manipulated by a radio control. The rear wheels 14, 14 are connected to a radio controllable drive motor 16 so that the motor toy can be desirably driven and stopped.

In this embodiment shown in FIG. 1, a battery receptacle 18 which receives batteries to be used as a power source for both the drive motor 16 and a radio receiver (not shown), is disposed at the almost center portion of a bottom face of the vehicle body 10 and adjacent to the drive motor 16. The battery receptacle 18 includes a rectangular battery-receiving chamber 20 and is integrally formed as a part of the plastic vehicle body 10. On one side wall of the battery receptacle 18 including the battery-receiving chamber 20 therein is provided a cut out portion 26 which guides and receives both a lead wire 22 for supplying power through the radio receiver to the drive motor 16 and a connector 24 attached to one end of the lead wire. At the side wall of the battery receptacle 18 is hinged a cover plate 28 for covering the cut out portion 26 and defining the battery-receiving chamber 20 therebeneath, while on an opposite side wall thereof is provided a holding tab 30 for retaining an end portion of the cover plate 28 opposed to the hinged portion thereof. The cover plate 28 is provided with a pair of hinge members 31, 31 on one end and with a hole 32 for receiving the tab 30 on the opposite end thereof.

According to the invention, the battery-receiving chamber 20 defined by surrounding walls should have enough space to receive either of a packaged nickel-cadmium battery unit mentioned hereinafter and a battery casing receiving a given number of individual batteries (for example, six or eight dry batteries of UM-3 type or nickel-cadmium batteries).

In this embodiment according to the invention, the battery casing is constituted as shown in FIG. 2. Referring to FIG. 2 the battery casing 34 consists of a rectangular plastic casing body 36. On inner faces of a pair of opposite side walls of the casing body 36 are provided four pairs of connecting terminals 38, 40 being respectively in electrically conductive connection with each electrode of batteries to be received in the casing body 36 (eight batteries of UM-3 type in this embodiment). A lead wire 42 for supplying a total combined voltage of the received batteries extends from one outside surface of the casing body 36. A connector 44 is attached to one end of the lead wire 42. There is provided any means such that thus formed battery casing 34 can be prevented from undesired displacement due to vibration exerted on a vehicle body and the like after being received in the battery-receiving chamber 20 of the battery receptacle 18. Referring to FIG. 1 as one example, a pair of grooves 48, 48 are provided on each inner face of a pair of opposite side walls of the receptacle, while a pair of projections 46, 46 corresponding to the grooves 48, 48 are provided on each outer face of a pair of the opposite side walls of the casing body 36. The connector 44 attached to one end of the lead wire 42 which is derived from the battery casing 34 can be in mutual connection with the connector 24 attached to the end of the lead wire 22 which is guided and received in the cut out portion 26 of the battery receptacle 18. Both connectors 24 and 44 can be appropriately received in the cut out portion 26.

Further, FIG. 3 shows a packaged nickel-cadmium battery unit which is usable in this embodiment. In FIG. 3, a packaged nickel-cadmium battery unit 50 comprises a given number of individual nickel-cadmium batteries which are arranged and packaged as one unit being in mutual connection therewith, a lead wire 52 for supplying a total combined voltage of the respective nickel-cadmium batteries, which extends from the packaged batteries, and a connector 54 attached to one end of the lead wire. In this case, the connector 54 of the packaged nickel-cadmium battery unit 50 can be connected to the connector 24 in the same manner as the connector 44 of the battery casing 34.

Thus, according to the invention, the battery receptacle 18 provided in the vehicle body 10 of the motor toy can receive the battery casing 34 or the packaged nickel-cadmium battery unit 50 upon occasional replacement.

Figure 4A:
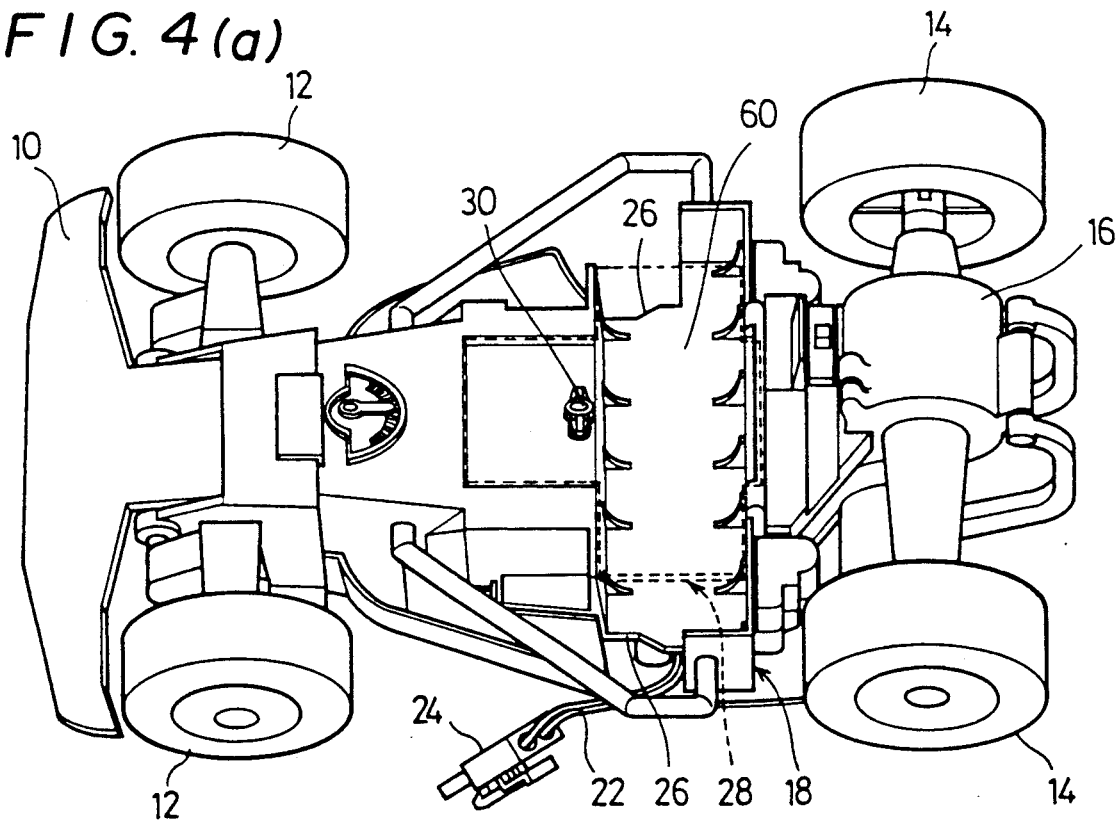
FIGS. 4(a) and 4(b) are schematic perspective views respectively illustrating a bottom face of a vehicle body of a radio controllable motor toy and a cover plate for a battery receptacle of the radio controllable motor toy made as another embodiment according to the invention.
Figure 4B:
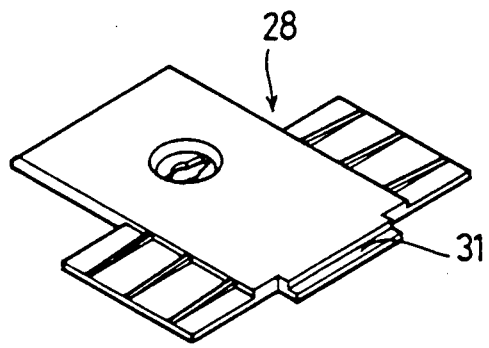

FIGS. 4(a) and 4(b) are respective schematic perspective views of the underside of and of a cover plate for a battery receptacle of a radio controllable motor toy shown as another embodiment according to the invention. FIGS. 5 and 6 are respective perspective views of a battery casing and a packaged nickel-cadmium battery unit which are usable in the embodiment shown in FIGS. 4(a) and 4(b). Since the vehicle body shown in FIGS. 4(a) and 4(b) has the same basic structure as that of the embodiment shown in FIG. 1, like reference numerals refer to like parts for explanatory convenience without a detailed explanation of the respective parts of FIGS. 1, 4(a) and 4(b).

In this embodiment shown in FIGS. 4(a) and 4(b), in the same manner as the aforementioned embodiment shown in FIG. 1, a battery receptacle 18 is disposed at the approximate center portion of a bottom face of a vehicle body 10 and adjacent to a drive motor 16. The battery receptacle 18 is provided with a battery-receiving chamber 60 for receiving batteries to be used as a power source for the drive motor 16. Each of a pair of opposite side walls of the battery receptacle 18 including the battery-receiving chamber 60 therein is partially cut out to form a cut out portion 26. The cut out portion 26 receives both a lead wire 22 for supplying power through a radio receiver to the drive motor 16, and a connector 24 attached to one end of the lead wire.

Further, FIG. 5 shows a battery casing which is usable in this embodiment according to the invention. Referring to FIG. 5, a battery casing 64 consists of a rectangular plastic casing body 66 having the same configurational dimension as that of a packaged nickel-cadmium battery unit mentioned hereinafter, and a cover plate 68 for closing a battery-receiving space in the casing body 66. On inner faces of a pair of opposite side walls of the casing body 66 are provided three pairs of connecting terminals 70, 72 which are respectively in electrically-conductive connection with each electrode of batteries to be received in the casing body 66 (six batteries of UM-3 type in this embodiment). A lead wire 74 for supplying a total combined voltage of the received batteries is derived from one outside surface of the casing body 66 and one end of the lead wire 74 is attached to a connector 76.

Further, FIG. 6 shows the packaged nickel-cadmium battery unit which is usable in this embodiment. In FIG. 6, in the same manner as that used in the aforementioned embodiment, a packaged nickel-cadmium battery unit 80 comprises a given number of nickel-cadmium batteries which are arranged and packaged as one unit being in mutual connection therewith, a lead wire 82 for supplying a total combined voltage of the nickel-cadmium batteries, which is derived from the packaged batteries, and a connector 84 attached to one end of the lead wire.

Thus, in this embodiment according to the invention, the battery-receiving chamber 60 of the battery receptacle 18 provided in the vehicle body 10 of the motor toy can receive either of the battery casing 66 and the packaged nickel-cadmium battery unit 80 upon occasional replacement.

As is obvious from the aforementioned embodiments, according to the invention, instead of a conventional battery receptacle for receiving individual batteries, a battery-receiving chamber which has enough space to receive either of a packaged nickel-cadmium battery unit for supplying a given combined output voltage and a battery casing receiving a given number of individual batteries, is provided on a bottom face of a vehicle body of a radio controllable motor toy so that either of the packaged nickel-cadmium battery unit and the battery casing receiving the individual batteries can be easily received with space saving in the motor toy and good interchangeability therebetween when used as a power source for a radio receiver and a drive motor of the motor toy.

Individual batteries can be conveniently treated as one unit by being received in a battery casing. Particularly, since individual nickel-cadmium batteries received in the battery casing can be simultaneously charged, whereby working efficiency can be improved and a structure of a battery charger can be simplified.

Although the invention has been described hereinbefore with preferred embodiments, it will be appreciated that many variations and modifications may be made without departing from the spirit and scope of the invention.

What is claimed is:

1. In a battery receptacle for radio controllable motor toys including a battery-receiving chamber which is formed in predetermined configuration on a bottom face of a plastic vehicle body of the radio controllable motor toy, batteries in said battery-receiving chamber being used as a power source for a radio receiver and a drive motor of the radio controllable motor toy; the improvement wherein said battery-receiving chamber is formed so as to have enough space to receive either of a packaged nickel-cadmium battery unit capable of developing a given combined output voltage and a battery casing capable of receiving a given number of individual batteries;

a cut out portion which is formed on one side wall of the battery receptacle including said battery-receiving chamber so as to receive two connectors and lead wires through which the radio receiver and the drive motor of the radio controllable motor toy are connected to said packaged nickel-cadmium battery unit or the battery casing to be used as the power source therefor; and two pairs of grooves formed on inner faces of a pair of opposite side walls of the battery receptacle to receive two pairs of projections formed on outer faces of a pair of opposite side walls of the battery casing, one of said opposite side walls of the battery receptacle having also said cut out portion.

2. A battery receptacle as claimed in claim 1, wherein said grooves are vertical.

3. A battery receptacle as claimed in claim 2, wherein said grooves in said one of said opposite side walls are disposed on opposite sides of said cut out portion.

* * * * *